US011030182B2

(12) United States Patent
Eluri et al.

(10) Patent No.: US 11,030,182 B2
(45) Date of Patent: Jun. 8, 2021

(54) TIMESTAMP BLOCK ITERATOR

(71) Applicant: SAP SE, Walldorf (DE)

(72) Inventors: Amarnadh Sai Eluri, Pleasanton, CA (US); Vimal Chandran Satheesh, Palo Alto, CA (US); Anupam Mukherjee, Palo Alto, CA (US); Mihnea Andrei, Issy les Moulineaux (FR)

(73) Assignee: SAP SE, Walldorf (DE)

( * ) Notice: Subject to any disclaimer, the term of this patent is extended or adjusted under 35 U.S.C. 154(b) by 206 days.

(21) Appl. No.: 16/276,560

(22) Filed: Feb. 14, 2019

(65) Prior Publication Data
US 2019/0370247 A1 Dec. 5, 2019

Related U.S. Application Data

(60) Provisional application No. 62/678,910, filed on May 31, 2018.

(51) Int. Cl.
G06F 16/00 (2019.01)
G06F 16/23 (2019.01)
(Continued)

(52) U.S. Cl.
CPC .......... *G06F 16/2343* (2019.01); *G06F 3/067* (2013.01); *G06F 3/0619* (2013.01);
(Continued)

(58) Field of Classification Search
CPC .......... G06F 21/10; G06F 21/31; G06F 21/33; G06F 21/6209; G06F 21/71; G06F 21/86; G06F 2211/007; G06F 2221/0737; G06F 2221/0797; G06F 2221/2101; G06F 2221/2135; G06F 2221/2137; G06F 2221/2151; G06F 16/2365; G06F 16/9535; G06F 9/45558; G06F 2009/45595; G06F 12/0246; G06F 16/137; G06F 16/2322; G06F 16/248; G06F 2212/7208; G06F 3/0683
See application file for complete search history.

(56) References Cited

U.S. PATENT DOCUMENTS 6,546,395 B1 * 4/2003 DeKimpe ............. G06F 16/283
8,364,648 B1 * 1/2013 Sim-Tang ........... G06F 16/2358
707/674
(Continued)

*Primary Examiner* — Shyue Jiunn Hwa
(74) *Attorney, Agent, or Firm* — Mintz Levin Cohn Ferris Glovsky and Popeo, P.C.

(57) ABSTRACT

A method may include iterating through at least a portion of a table stored in a database by identifying a timestamp block associated with a range of rows forming the portion of the table. In response to determining that the timestamp block is a sparse timestamp block storing timestamps associated with only some of the rows in the first range of rows, generating a bitmap. Each of the binary values in the bitmap may correspond one of the rows in the range of rows. Moreover, each of the binary values in the bitmap may indicate whether the timestamp block includes a timestamp associated with a corresponding row from the range of rows. Iterating through the range of rows may include accessing, based on the bitmap, the timestamp block to read or write timestamps of transaction affecting the rows in the range of rows.

19 Claims, 10 Drawing Sheets

(51) Int. Cl.
*G06F 16/18* (2019.01)
*G06F 9/50* (2006.01)
*G06F 16/901* (2019.01)
*G06F 3/06* (2006.01)
*G06F 16/908* (2019.01)

(52) U.S. Cl.
CPC .......... *G06F 3/0647* (2013.01); *G06F 9/5016* (2013.01); *G06F 16/1865* (2019.01); *G06F 16/2379* (2019.01); *G06F 16/901* (2019.01); *G06F 16/908* (2019.01)

(56) References Cited

U.S. PATENT DOCUMENTS

| | | | |
|---|---|---|---|
| 2014/0095438 A1* | 4/2014 | Marwah | G06F 16/217 707/639 |
| 2016/0125022 A1* | 5/2016 | Rider | G06F 16/2379 707/607 |

* cited by examiner

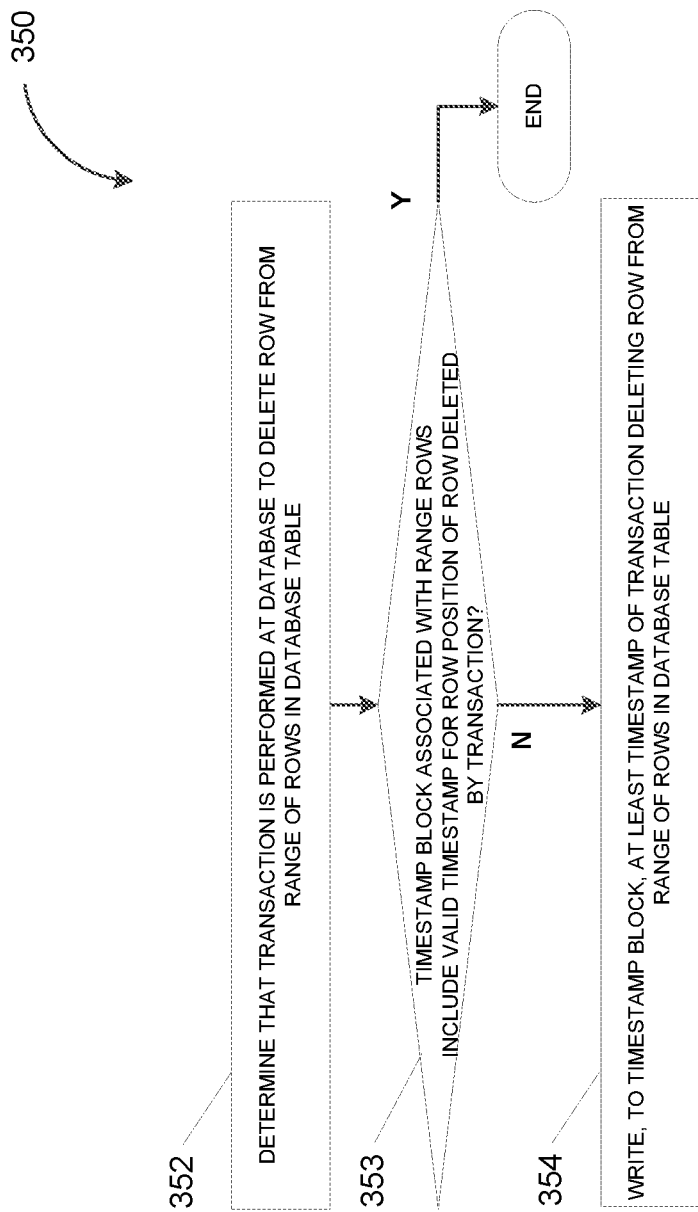

TIMESTAMP BLOCK ITERATOR

CROSS REFERENCE TO RELATED APPLICATION

This application claims priority to U.S. Provisional Application No. 62/678,910, filed on May 31, 2018 and entitled "ADAPTIVE TIMESTAMP ACCESSOR," the disclosure of which is incorporated herein by reference in its entirety.

TECHNICAL FIELD

The subject matter described herein relates generally to database processing and more specifically to concurrency control for database transactions.

BACKGROUND

A database management system (DBMS) may be configured to store a plurality of data records. In a relational database, the database management system may store the data records as rows in one or more database tables. Moreover, the database management system may perform one or more transactions operating on the data records stored in the database. A transaction may include one or more structured query language (SQL) statements that operate on the data records stored in the database including by, for example, selecting, updating, inserting, and/or deleting one or more corresponding rows in the database tables. To maintain consistency in the database, the database management system may not commit a transaction, for example, by persisting the changes associated with the transaction in the database, unless every SQL statement included in the transaction are executed successfully. Otherwise, if an error occurs during the transaction, the database management system may rollback the transaction including by reversing the changes applied to the database by executing the SQL statements included in the transaction.

The database management system may implement multi-version concurrency control (MVCC) in order to support multiple concurrent transactions without imposing read-write locks. Accordingly, each transaction may operate on a snapshot capturing the state of the data records in the database at a particular point in time. The contents of a snapshot available to a transaction may be determined based on the time of that transaction as well as the time when other transactions also operating on the data records stored in the database are committed to the database. For example, the snapshot available to a first transaction may include a data record inserted and/or updated by a second transaction if the first transaction is performed after the second transaction is committed to the database. By contrast, the data record may be excluded from the snapshot if the first transaction is performed before the second transaction is committed to the database.

SUMMARY

Systems, methods, and articles of manufacture, including computer program products, are provided for iterating through one or more timestamp blocks. In some example embodiments, there is provided a system that includes at least one processor and at least one memory. The at least one memory may include program code that provides operations when executed by the at least one processor. The operations may include: iterating through at least a portion of a table stored in a database by at least identifying a first timestamp block associated with a first range of rows comprising at least the portion of the table; in response to determining that the first timestamp block comprises a sparse timestamp block storing timestamps associated with some but not all of a plurality of rows in the first range of rows, generating a bitmap including a plurality of binary values, each of the plurality of binary values corresponding to one of the plurality of rows in the first range of rows, and each of the plurality of binary values indicating whether the first timestamp block includes a timestamp associated with a corresponding one of the plurality of rows in the first range of rows; and iterating through the first range of rows by at least accessing, based at least on the bitmap, the first timestamp block to read or write at least a first timestamp associated with a first row in the first range of rows, the first timestamp further being associated with a first transaction.

In some variations, one or more features disclosed herein including the following features can optionally be included in any feasible combination. The sparse timestamp block may further store a second timestamp associated with a second row in the first range of rows. The second timestamp may be associated with the first transaction or a second transaction. The first timestamp and the second timestamp may be stored without being sorted based on a respective row position of the first row and the second row.

In some variations, in response to determining that the first timestamp block is a dense timestamp block, the first timestamp block may be accessed to read or write the first timestamp. The dense timestamp block may be configured to store every timestamp associated with the first range of rows. The first timestamp may be read or written at an offset in the first timestamp block corresponding to a row position of the first row.

In some variations, reading the first timestamp may include determining, based at least on the bitmap, whether the first timestamp block includes a timestamp for a row position of the first row.

In some variations, the first timestamp may be written to the first timestamp block based at least on the bitmap indicating an absence of a second timestamp associated with first row in the first timestamp block.

In some variations, writing the first timestamp associated with the first row to the first timestamp block may include determining that the first timestamp block has reached maximum capacity. Furthermore, in response to determining that the first timestamp block has reached maximum capacity, a second timestamp block may be allocated for storing the first timestamp. The second timestamp block may be a dense timestamp block configured to store every timestamps associated with the first range of rows.

In some variations, prior to writing the first timestamp to the first timestamp block, a lock configured to prevent the first timestamp block from being replaced with a third timestamp block by another thread writing to the first timestamp block may be acquired.

In some variations, the first transaction may insert or delete the plurality consecutive rows comprising at least the portion of the table in the database. The one or more timestamps may include creation timestamps associated with the insertion of each of the plurality of consecutive rows or deletion timestamps associated with the deletion of each of the plurality of consecutive rows.

In some variations, at least the portion of the table may be iterated in response to the first transaction inserting or deleting a plurality of consecutive rows including at least the portion of the table.

In some variations, a quantity of rows in a second range of rows comprising the table affected by the first transaction may be determined. In response to the quantity of rows exceeding a capacity of the sparse timestamp block, a dense timestamp block may be allocated instead of the sparse timestamp block. The dense timestamp block may be configured to store every timestamp associated with the second range of rows. The second range of rows may be iterated to at least write the first timestamp associated with the first transaction.

In some variations, a second transaction may be performed on the first row in the first range of rows. The second transaction may be performed on a version of the first row modified by the first transaction based at least on the first timestamp associated with the first transaction being less than a second timestamp associated with the second transaction.

In some variations, the iterating through at least the portion of the table may further include identifying a second timestamp block associated with a second range of rows comprising at least the portion of the table.

In some variations, at least the portion of the table may be iterated to at least identify, based at least on one or more timestamps stored in the first timestamp block, all visible rows and/or invisible rows included in at least the portion of the table.

In some variations, at least the portion of the table may be iterated to at least identify, based at least on one or more timestamps stored in the first timestamp block, all rows in at least the portion of the table that are inserted and/or deleted between a first time and a second time.

In another aspect, there is provided a method for iterating through one or more timestamp blocks. The method may include: iterating through at least a portion of a table stored in a database by at least identifying a first timestamp block associated with a first range of rows comprising at least the portion of the table; in response to determining that the first timestamp block comprises a sparse timestamp block storing timestamps associated with some but not all of a plurality of rows in the first range of rows, generating a bitmap including a plurality of binary values, each of the plurality of binary values corresponding to one of the plurality of rows in the first range of rows, and each of the plurality of binary values indicating whether the first timestamp block includes a timestamp associated with a corresponding one of the plurality of rows in the first range of rows; and iterating through the first range of rows by at least accessing, based at least on the bitmap, the first timestamp block to read or write at least a first timestamp associated with a first row in the first range of rows, the first timestamp further being associated with a first transaction.

In some variations, one or more features disclosed herein including the following features can optionally be included in any feasible combination. The sparse timestamp block may further store a second timestamp associated with a second row in the first range of rows. The second timestamp may be associated with the first transaction or a second transaction. The first timestamp and the second timestamp may be stored without being sorted based on a respective row position of the first row and the second row.

In some variations, the method may further include: in response to determining that the first timestamp block comprises a dense timestamp block, accessing the first timestamp block to read or write the first timestamp, the dense timestamp block being configured to store every timestamp associated with the first range of rows, and the first timestamp being read or written at an offset in the first timestamp block corresponding to a row position of the first row.

In some variations, reading the first timestamp may include determining, based at least on the bitmap, whether the first timestamp block includes a timestamp for a row position of the first row.

In some variations, the first timestamp may be written to the first timestamp block based at least on the bitmap indicating an absence of a second timestamp associated with first row in the first timestamp block.

In another aspect, there is provided a computer program product that includes a non-transitory computer readable medium storing instructions. The instructions may cause operations when executed by at least one data processor. The operations may include: iterating through at least a portion of a table stored in a database by at least identifying a first timestamp block associated with a first range of rows comprising at least the portion of the table; in response to determining that the first timestamp block comprises a sparse timestamp block storing timestamps associated with some but not all of a plurality of rows in the first range of rows, generating a bitmap including a plurality of binary values, each of the plurality of binary values corresponding to one of the plurality of rows in the first range of rows, and each of the plurality of binary values indicating whether the first timestamp block includes a timestamp associated with a corresponding one of the plurality of rows in the first range of rows; and iterating through the first range of rows by at least accessing, based at least on the bitmap, the first timestamp block to read or write at least a first timestamp associated with a first row in the first range of rows, the first timestamp further being associated with a first transaction.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or statements or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to concurrency control, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3D depicts a flowchart illustrating a process for writing a deletion timestamp to a sparse timestamp block or a dense timestamp block, in accordance with some example embodiments;

When practical, similar reference numbers denote similar structures, features, or elements.

DETAILED DESCRIPTION

Figure 1:
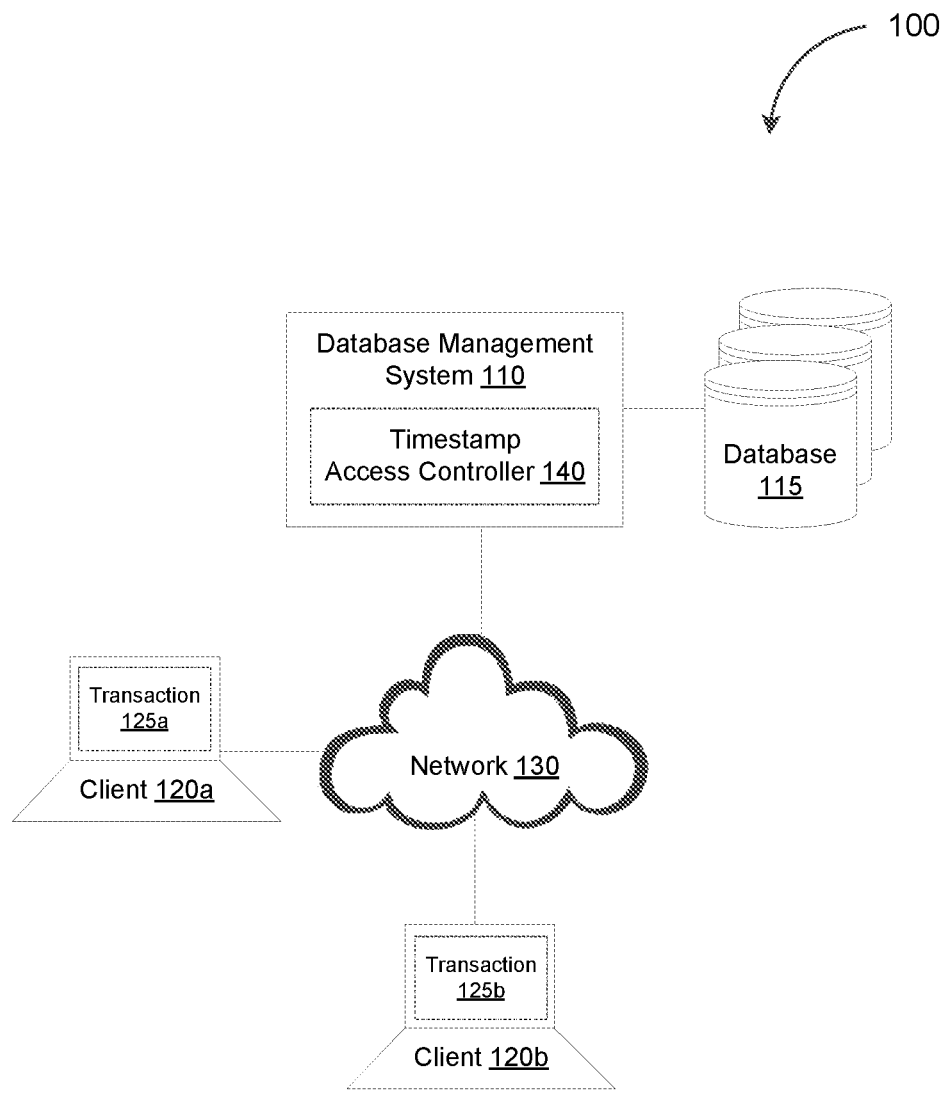
FIG. 1 depicts a system diagram illustrating a database system, in accordance with some example embodiments.

To implement multi-version concurrency control (MVCC), a database management system may store commit timestamps indicating when transactions operating on the data records stored in a database are committed to the database. For example, the database management system may store a commit timestamp indicating when a transaction inserting or deleting a data record in the database is committed to the database. The visibility of a corresponding row to another transaction may be determined based on the commit timestamp and a snapshot timestamp of the snapshot available to the other transaction. For instance, the row may be visible to the other transaction and included in the snapshot available to the other transaction if the commit timestamp associated with the row is earlier than the snapshot timestamp. By contrast, the row may be invisible to the other transaction and excluded from the snapshot available to the other transaction if the commit timestamp associated with the row is later than the snapshot timestamp.

The database management system may store timestamps in timestamp blocks occupying one or more multi-version concurrency control (MVCC) pages. In some example embodiments, instead of allocating only fixed sized timestamp blocks for storing timestamps, the database management system may allocate dense timestamp blocks as well as sparse timestamp blocks capable of holding fewer timestamps than the dense timestamp blocks. For example, while a dense timestamp block may be allocated with sufficient storage space to hold timestamps for an entire range of rows in the database, a sparse timestamp block may be allocated with sufficient storage space to hold timestamps for only a portion of the range of rows from the database. Accordingly, the database management system may first allocate a sparse timestamp block for storing the timestamps of transactions operating on the range of rows. When the quantity of timestamps exceeds the capacity of the sparse timestamp block, the database management system may allocate a dense timestamp block. Furthermore, the database management system may replace the sparse timestamp block by at least migrating, to the dense timestamp block, the timestamps stored in the sparse timestamp block. The timestamps of subsequent transactions operating on the same range of rows may be stored to the dense timestamp block instead of the sparse timestamp block.

The database management system may allocate different timestamp blocks for storing the timestamps of rows inserted into the database and the timestamps of rows deleted from the database. For example, the database management system may allocate dense timestamp blocks for storing the timestamps of bulk and/or frequent transactions affecting large quantity of rows in the database. By contrast, the database management system may allocate sparse timestamp blocks for storing the timestamps of piecemeal and/or infrequent transactions that affect only a small quantity of rows in the database. It should be appreciated that transactions inserting rows into the database may often occur in bulk and outnumber transactions deleting rows from the database. Accordingly, in some example embodiments, the database management system may allocate dense timestamp blocks for storing creation timestamps, which may correspond to the commit timestamp of transactions inserting rows into the database. Meanwhile, the database management system may allocate sparse timestamp blocks for storing deletion timestamps, which may correspond to the commit timestamps of transactions deleting rows from the database. The sparse timestamp block may be replaced with a dense timestamp block only when the quantity of deletion timestamps exceeds the capacity of the sparse timestamp block. In doing so, the database management system may minimize the quantity of unused storage space allocated for storing deletion timestamps.

As noted, a dense timestamp block may be allocated with sufficient storage space to hold timestamps for an entire range of rows in the database whereas sparse timestamp blocks may be allocated with sufficient storage space to hold timestamps for only a portion of the range of rows. As such, sparse timestamp blocks may store timestamps in a different manner than dense timestamp blocks. For example, the timestamps in a dense timestamp block may be indexed in accordance with the position of the corresponding rows in the range of the rows. By contrast, the timestamps in a sparse timestamp block may be stored with the corresponding row positions. Furthermore, the timestamps in a sparse timestamp block may not be sorted in accordance with the corresponding row positions when the sparse timestamp block is being used to store deletion timestamps. Accordingly, in some example embodiments, the database management system may include an adaptive timestamp access controller capable of accessing sparse timestamp blocks as well as dense timestamp blocks. The adaptive timestamp access controller may be configured to optimize the reading and/or writing of timestamps in sparse timestamp blocks as well as dense timestamp blocks. Moreover, the adaptive timestamp access controller may be configured to synchronize access to sparse timestamp blocks that are being replaced with dense timestamp blocks.

FIG. 1 depicts a system diagram illustrating a database system 100, in accordance with some example embodiments. Referring to FIG. 1, the database system 100 may include a database management system 100 coupled with a database 115. The database system 100 may further include one or more clients including, for example, a first client 120a, a second client 120b, and/or the like. The first client 120a and/or the second client 120b may be any processor-based device including, for example, a workstation, a desktop computer, a laptop computer, a tablet computer, a mobile device, a wearable apparatus, and/or the like. Moreover, as shown in FIG. 1, the first client 120a and the second client 120b may be communicatively coupled with the database management system 110 via a network 130. The network 130 may be any wired and/or wireless network including, for example, a wide area network (WAN), a local area network (LAN), a virtual local area network (VLAN), a public land mobile network (PLMN), the Internet, and/or the like.

Referring again to FIG. 1, the first client 120a and the second client 120b may access the data records stored in the database 115, for example, as rows in one or more database tables. For example, the first client 120a may request to perform a first transaction 125a while the second client 120b may request to perform a second transaction 125b. Each of the first transaction 125a and the second transaction 125b may include one or more structured query language (SQL) statements that operate on the data records stored in the database 115 including by, for example, selecting, updating, inserting, and/or deleting one or more corresponding rows in the database tables.

In order to perform the first transaction 125a and the second transaction 125b concurrently without imposing any read-write blocks, the database management system 110 may implement multi-version concurrency control (MVCC). Accordingly, the first transaction 125a and the second transaction 125b may each operate on a snapshot capturing the state of the data records in the database 115 at a particular point in time. As noted, the contents of a snapshot available to a transaction may be determined based on the time of that transaction as well as the time when other transactions also operating on the data records stored in the database are committed to the database. For example, the snapshot available to the first transaction 125a may include a data record inserted and/or updated by the second transaction 125b if the first transaction 125a is performed after the second transaction 125b is committed to the database. By contrast, the data record may be excluded from the snapshot if the first transaction 125a is performed before the second transaction 125b is committed to the database.

To implement multi-version concurrency control, the database management system 110 may store commit timestamps indicating when, for example, the first transaction 125a and the second transaction 125b are committed to the database. However, it should be appreciated that the database management system 110 may first store a temporary timestamp for each of the first transaction 125a and the second transaction 125b. The temporary timestamps may subsequently be replaced with the commit timestamps of the first transaction 125a and/or the second transaction 125b, which may be stored in corresponding transaction control blocks (TCBs) during the interim. For example, the database management system 110 may store these timestamps in timestamp blocks occupying one or more multi-version concurrency control (MVCC) pages. In some example embodiments, the database management system 110 may be configured to allocate dense timestamp blocks as well as sparse timestamp blocks for storing the commit timestamps. The database management system 110 may store, in a sparse timestamp block or a dense timestamp block, the commit timestamp associated with the first transaction 125a and/or the second transaction 125b. In the event the database management system 110 is required to roll back the first transaction 125a and/or the second transaction 125b, for example, due to the occurrence of an error, the database management system 110 may invalidate the commit timestamps associated with the first transaction 125a and/or the second transaction 125b.

As noted, sparse timestamp blocks may be capable of holding fewer timestamps than the dense timestamp blocks. For example, while a dense timestamp block may be allocated with sufficient storage space to hold timestamps for an entire range of rows in the database 115, a sparse timestamp block may be allocated with sufficient storage space to hold timestamps for only a portion of the range of rows from the database 115. Moreover, the timestamps in a dense timestamp block may be indexed in accordance with the position of the corresponding rows in the range of the rows. By contrast, the timestamps in a sparse timestamp block may be stored with the corresponding row positions although the timestamps in the sparse timestamp block may not be sorted in accordance with the corresponding row positions.

In some example embodiments, the database management system 110 may allocate different timestamp blocks for storing creation timestamps and deletion timestamps. For example, referring again to FIG. 1, the database management system 110 may include a timestamp access controller 140 configured to allocate, modify, and/or provide access one or more timestamp blocks including, for example, sparse timestamp blocks as well as dense timestamp blocks. For example, the timestamp access controller 140 may be configured to optimize the setting of timestamps in a sparse timestamp block, which may require the sparse timestamp block to be replaced with a dense timestamp block. Furthermore, the timestamp access controller 140 may be configured to synchronize access to the sparse timestamp block even while the sparse timestamp block is being replaced by the dense timestamp block.

As noted, dense timestamp blocks may be allocated for storing the timestamps of bulk and/or frequent transactions affecting large quantity of rows in the database whereas sparse timestamp blocks may be allocated for storing the timestamps of piecemeal and/or infrequent transactions that affect only a small quantity of rows in the database. Moreover, transactions inserting rows into the database may often occur in bulk and outnumber transactions deleting rows from the database. Accordingly, the database management system 110 may allocate a dense timestamp block for storing the commit timestamp of the first transaction 125a if the first transaction 125a inserts a row into the database 115. Alternatively and/or additionally, the database management system 110 may allocate a sparse timestamp block for storing the commit timestamp of the second transaction 125b if the second transaction 125b deletes a row from the database 115.

In some example embodiments, the database management system 110 may replace a sparse timestamp block with a dense timestamp block when the sparse timestamp block reaches maximum capacity. The database management system 110 may replace the sparse timestamp by at least migrating, to the dense timestamp block, the timestamps stored in the sparse timestamp block. Because the database management system 100 may allocate dense timestamp blocks on a need basis, the database management system 110 may minimize the quantity of unused storage space associated with dense timestamp blocks. Nevertheless, where the first transaction 125a and/or the second timestamp 125b modify a large quantity of rows to generate more timestamps than a sparse timestamp block is able to accommodate, the database management system 110 may avoid an unnecessary switch from the sparse timestamp block to a dense timestamp block by allocating the dense timestamp block instead of the sparse timestamp block.

For example, during a delta merge operation in which timestamp blocks are transferred from delta storage to main storage, sparse timestamp blocks as well as dense timestamp blocks may be moved from delta storage to main storage. As used herein, main storage may refer to memory storing a main portion of data whereas delta storage may refer to memory storing only a changed portion of the data. Changes from write operations may be stored first in delta storage before being committed to main storage by performing a delta merge operation. By contrast, read operations may require merging data read from main storage as well as delta storage.

In some example embodiments, if a sparse timestamp block in delta storage has reached maximum capacity or is close to reaching maximum capacity, moving the sparse timestamp block to main storage may include replacing the sparse timestamp block in delta memory with a dense timestamp block in main storage. That is, instead of moving the sparse timestamp block from delta storage to main storage, a dense timestamp block may be created in main storage and the timestamps in the sparse timestamp block in delta storage may be stored in the dense timestamp block in main storage if the remaining capacity in the sparse timestamp block is below a threshold value. The dense timestamp block may be created in the main storage in order to avoid a subsequent switch from the sparse timestamp block to the dense timestamp block.

Alternatively and/or additionally, a delta merge operation may require moving a dense timestamp block from delta storage to main storage. Nevertheless, the dense timestamp block in delta storage may be sparsely populated with timestamps. Accordingly, moving the dense timestamp block from delta storage to main storage may include replacing the dense timestamp block in delta memory with a sparse timestamp block in main storage. For example, if the quantity of timestamps in a dense timestamp block in delta storage does not exceed a threshold value, a delta merge operation may be performed by creating a sparse timestamp block in main storage. The timestamps stored in the dense timestamp block in delta memory may be moved and stored, as part of the delta merge operation, in the sparse timestamp block in main memory.

Figure 2A:
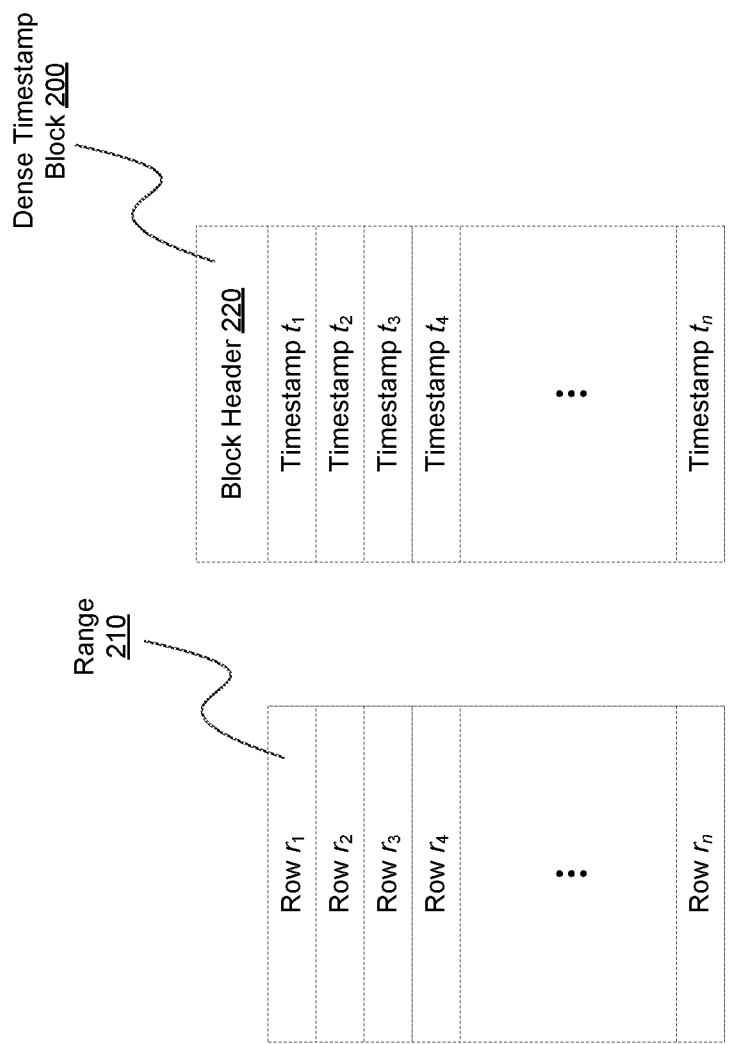
FIG. 2A depicts an example of a dense timestamp block, in accordance with some example embodiments.

To further illustrate, FIG. 2A depicts an example of a dense timestamp block 200, in accordance with some example embodiments. Referring to FIGS. 1 and 2A, the database management system 110 may allocate the dense timestamp block 200 to include sufficient storage space for storing timestamps for an entire range 210 of rows from a database table in the database 115. For example, as shown in FIG. 2A, the range 210 may include an n quantity of rows (e.g., rows $r_1, r_2, r_3, r_4, \ldots, r_n$). Accordingly, the dense timestamp block 200 may be allocated to include sufficient storage space to store an n quantity of timestamps (e.g., timestamps $t_1, t_2, t, t_4, \ldots, t_n$).

Referring again to FIG. 2A, the n quantity of timestamps included in the dense timestamp block 200 may be indexed in accordance with the n quantity of rows included in the range 210. That is, the i-th timestamp $t_i$ in the dense timestamp block 200 may correspond to the i-th row $r_i$ in the range 210. Meanwhile, as FIG. 2A shows, the dense timestamp block 200 may include a header 220 storing a row position of the first row $r_1$ associated with the timestamp $t_1$ in the dense timestamp block 200. As such, the i-th timestamp $t_i$ associated with the i-th row $r_i$ in the range 210 may be located in the dense timestamp block 200 by at least determining, based on a row position of the i-th row $r_i$ and the row position of the first row $r_1$ associated with the timestamp $t_1$ in the dense timestamp block 200, an offset in the dense timestamp block 200 holding the i-th timestamp $t_i$. For example, the i-th timestamp $t_i$ associated with the i-th row $r_i$ in the range 210 may be located at the i-th offset in the dense timestamp block 200.

Figure 2B:
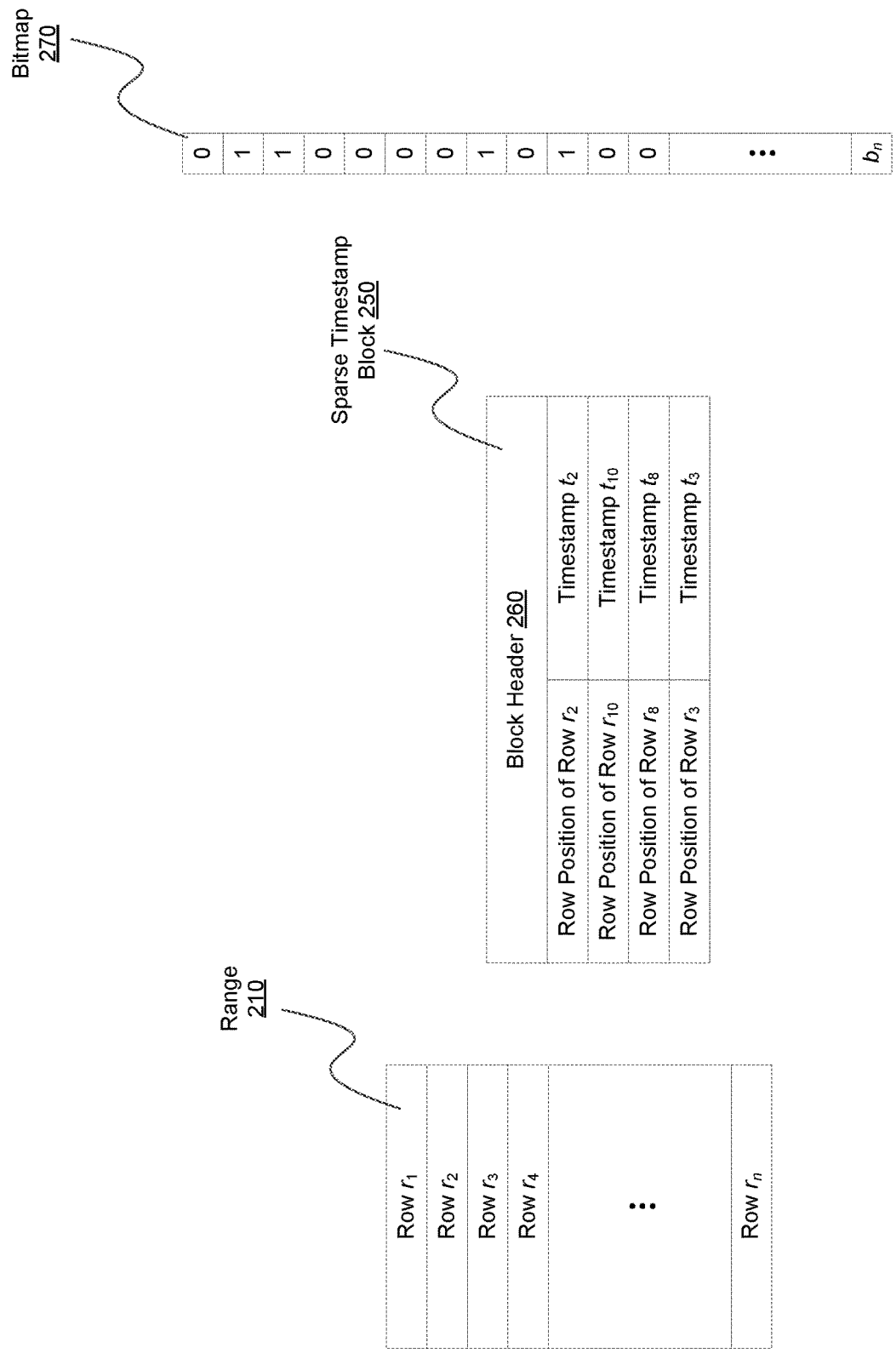
FIG. 2B depicts an example of a sparse timestamp block, in accordance with some example embodiments.

FIG. 2B depicts an example of a sparse timestamp block 250, in accordance with some example embodiments. Referring to FIGS. 1 and 2A-B, the database management system 110 may allocate the sparse timestamp block 250 to include sufficient storage space for storing timestamps associated with only a portion of the range 210 of rows from the database table in the database 115. In the example shown in FIG. 2B, the sparse timestamp block 250 may be allocated to include sufficient storage space for four timestamps associated with the range 210. However, it should be appreciated that the sparse timestamp block 250 may be allocated to include storage space for any quantity of timestamps fewer than the n quantity of timestamps stored in the dense timestamp block 200.

As shown in FIG. 2B, in some example embodiments, the sparse timestamp block 250 may store the commit timestamp of a transaction as well as the row position of the row in the range 210 affected by the transaction. For example, the sparse timestamp block 250 may store the timestamp $t_2$ of a transaction along with the row position of the second row $r_2$ from the range 210 affected by that transaction. Alternatively and/or additionally, the sparse timestamp block 250 may store the timestamp $t_{10}$ of a transaction operating on the tenth row $r_{10}$ in the range 210 along with the row position of the tenth row $r_{10}$. The sparse timestamp block 250 may also store the timestamp $t_8$ of a transaction operating on the eighth row $r_8$ in the range 210 along with the row position of the eighth row $r_8$.

While the timestamps in the dense timestamp block 200 are indexed in accordance with the position of the corresponding rows in the range 210, the timestamps in the sparse timestamp block 250 may not be sorted in accordance with the corresponding row positions. For instance, FIG. 2B shows the timestamp $t_2$ associated with the tenth row $r_{10}$ being stored after the timestamp $t_1$ associated with the second row $r_2$ but before the timestamp $t_3$ associated with the eight row $r_8$. The timestamps stored in the sparse timestamp block 250 may remain unsorted when the sparse timestamp block 250 is being used for storing deletion timestamps because the deletion of rows from the range 210 may occur in any order whereas the insertion of rows into the range 210 may occur in a strictly a monotonically increasing order.

Referring again to FIG. 2B, the sparse timestamp block 250 may also include a header 260. The header 260 may include a flag identifying for example, to the database management system 110, the sparse timestamp block 250 as a sparse timestamp block and not a dense timestamp block. Alternatively and/or additionally, the header 260 may include an indication of a next offset in the sparse timestamp block 250 available for storing an additional timestamp. For example, subsequent to storing the timestamp $t_8$ associated with the eighth row $r_8$ in the sparse timestamp block 250, the value of the next offset in the header 260 may be updated to the next offset in the sparse timestamp block 250 available for storing another timestamp. By contrast, subsequent to storing the fourth timestamp $t_4$ associated with the third row $r_3$ in the sparse timestamp block 250, the value of the next offset in the header 260 may be updated to a value to indicate that the sparse timestamp block 250 has reached maximum capacity.

Table 1 below depicts pseudo programming code implementing a sparse timestamp block such as, for example, the sparse timestamp block 250. It should be appreciated that the quantity of storage space associated with a sparse timestamp block may be variable.

TABLE 1

```
class MVCCSparseTimestampBlock : public MVCCBlockHeader
{
    size_t                           m_nextOffset;
    size_t                           m_MaxEntries;
    TransactionManager::MVCCTimestamp m_InvalidTS;
    uint32_t                         m_Data[1];
};
```
m_MaxEntries holds the capacity of the sparse block in (rpos, ts) pairs.
m_Data[1] is the Data block containing the rowPos & timestamp information. m_Data[0] till m_Data[m_MaxEntries − 1] contains RowPos values. m_Data[m_MaxEntries] till the end of the data block will contain the timestamp values. i.e RowPos m_Data[i] is mappend to TS at m_Data[m_MaxEntries + (i * 2)] & m_Data[m_MaxEntries + (i * 2) + 1].

When the sparse timestamp block 250 reaches maximum capacity, the database management system 110 may be configured to replace the sparse timestamp block 250, for example, with the dense timestamp block 200. In some example embodiments, the sparse timestamp block 250 may be replaced by at least migrating, to the dense timestamp block 200, the timestamps stored in the sparse timestamp block 250. For instance, in the example show in FIG. 2B, the timestamp $t_2$ associated with the second row $r_2$ may be migrated to the dense timestamp block 200 by at least storing, at an offset in the dense timestamp block 200 corresponding to the second row $r_2$, the timestamp $t_2$ associated with the second row $r_2$. Alternatively and/or additionally, the timestamp $t_{10}$ associated with the tenth row $r_{10}$ may also be migrated to the dense timestamp block 200 by at least storing, at an offset in the dense timestamp block 200 corresponding to the tenth row $r_{10}$, the timestamp $t_{10}$. The timestamp $t_8$ associated with the eighth row $r_8$ may be migrated to the dense timestamp block 200 by at least storing the timestamp $t_8$ at an offset in the dense timestamp block 200 corresponding to the eighth row $r_8$. Furthermore, the timestamp $t_3$ associated with the third row $r_3$ in the range 210 may be migrated to the dense timestamp block 200 by at least storing the timestamp $t_3$ at an offset in the dense timestamp block 200 corresponding to the third row $r_3$.

Once the sparse timestamp block 250 is replaced with the dense timestamp block 200, the timestamp access controller 140 may move the sparse timestamp block 200 to a garbage collection queue. However, to avoid the sparse timestamp block 250 from being prematurely released for reclamation while active reader threads are still operating on the sparse timestamp block 250, the timestamp access controller 140 may first move the sparse timestamp block 250 to a transient queue. The sparse timestamp block 250 may remain in the transient queue until all active reader threads operating on the sparse timestamp block 250 are complete, at which point the sparse timestamp block 250 may be moved to a garbage collection queue for reclamation during a subsequent garbage collection process.

Referring again to FIG. 2B, the sparse timestamp block 250 may be associated with a bitmap 270, which may be generated to optimize iteration through the range 210 of rows when timestamps associated with the range 210 are held in the sparse timestamp block 250. The iteration of the range 210 may be performed in order to generate a list of all visible rows and/or invisible rows in the range 210 and/or at least a portion of a database table including the range 210. Alternatively and/or additionally, the iteration of the range 210 may be performed in order to generate a list of all rows that have been inserted or deleted within a specified timeframe (e.g., between a first time $t_1$ and a second time $t_2$).

As noted, the timestamps stored in the sparse timestamp block 250 may not be sorted in accordance with the corresponding row positions when the sparse timestamp block 250 is being used to store deletion timestamps. Thus, iterating through the range 210 to read and/or write timestamps associated with consecutive rows in the range 210 may require an excessive quantity of comparisons. For example, in the worst case scenario, the row position of each of the n quantity of rows (e.g., rows $r_1, r_2, r_3, r_4, \ldots, r_n$) in the range 210 may be compared against every row position held in the sparse timestamp block 250.

In order to improve the performance associated with the iteration through the range 210 of rows in the database 115, the timestamp access controller 140 may generate the bitmap 270. As shown in FIG. 2B, the bitmap 270 may include an n quantity of binary values (e.g., 0, 1, 1, 0, 0, 0, 0, 1, 0, 1, 0, 0, . . . , $b_n$). Each of the n quantity of binary values in the bitmap 170 may correspond to one of the n quantity of rows in the range 210. For example, the i-th binary value in the bitmap 270 may correspond to the i-th row $r_i$ in the range 210. Moreover, the value of the i-th binary value in the bitmap 270 may indicate whether the sparse timestamp block 250 includes the row position of the i-th row $r_i$ in the range 210.

According to some example embodiments, the bitmap 270 may be used to iterate through the range 210 of rows when the timestamps associated with the range 210 are stored in the sparse timestamp block 250. For example, when iterating through the range 210 of rows in the database 115, the timestamp access controller 140 may determine, based on the value of the i-th binary value in the bitmap 270, whether the sparse timestamp block 250 includes the row position of the i-th row $r_i$ in the range 210. The timestamp access controller 140 may search the sparse timestamp block 250 to locate the row position of the i-th row $r_i$ in the range 210 only if the value of the i-th binary value in the bitmap 270 indicates that the sparse timestamp block 250 includes the row position of the i-th row $r_i$ in the range 210. By contrast, the timestamp access controller 140 may avoid searching the sparse timestamp block 250 to locate the row position of the i-th row $r_i$ in the range 210 if the value of the i-th binary value in the bitmap 270 indicates that the row position of the i-th row $r_i$ in the range 210 is absent from the sparse timestamp block 250.

Figure 2C:
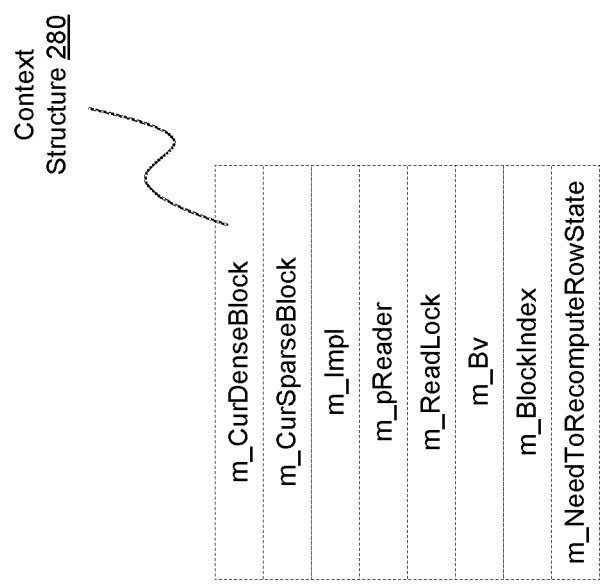
FIG. 2C depicts an example of a context structure, in accordance with some example embodiments.

In some example embodiments, the bitmap 270 may be part of a context structure 280 shown in FIG. 2C. Referring to FIG. 2C, the context structure 270 may maintain the context of a iteration across multiple timestamp blocks including, for example, sparse timestamp blocks as well as dense timestamp blocks. As shown in FIG. 2C, the context structure 270 may include a pointer to a dense timestamp block (e.g., m_CurDenseBlock) and a pointer to a sparse timestamp block (e.g., m_CurSparseBlock). The progress of the iteration, for example, the current timestamp block being accessed as part of the iteration, may be indicated by setting one but not both of these timestamps.

In some example embodiments, the context structure 270 may further include application programming interfaces (APIs) and locks for performing the iteration over sparse timestamp blocks. Referring again to FIG. 2C, the context structure 270 may include a pointer (e.g., m_Impl) to the application programming interface (API) managing sparse timestamp blocks and dense timestamp blocks as well as the object (e.g., m_pReader) holding the application programming interface. This application programming interface (API) may be called to dirty the pages associated with the sparse timestamp blocks and/or dense timestamp blocks accessed as part of the iteration The context structure 270 may also include a lock (e.g., m_ReadLock) that may be applied while performing a write operation to a sparse timestamp block to prevent the sparse timestamp block from being switched to a dense timestamp block during the write operation. Moreover, as noted, the context structure 270 may include the bitmap 270 (e.g., m_BV), which may store binary values identifying each row position within a range of rows as being present or absent from the sparse timestamp.

In addition, FIG. 2C shows the context structure 270 as including a block index (e.g., m_BlockIndex), which may correspond to the block index of the current timestamp block. The context structure 270 may also include an indicator (e.g., m_NeedToRecomputeRowState) whose value may indicate the occurrence of one or more fallback operations that may require a re-computation of the row state of the rows in a timestamp block. For example, the row state of a row may be updated, during garbage collection, to visible or invisible.

Figure 3A:
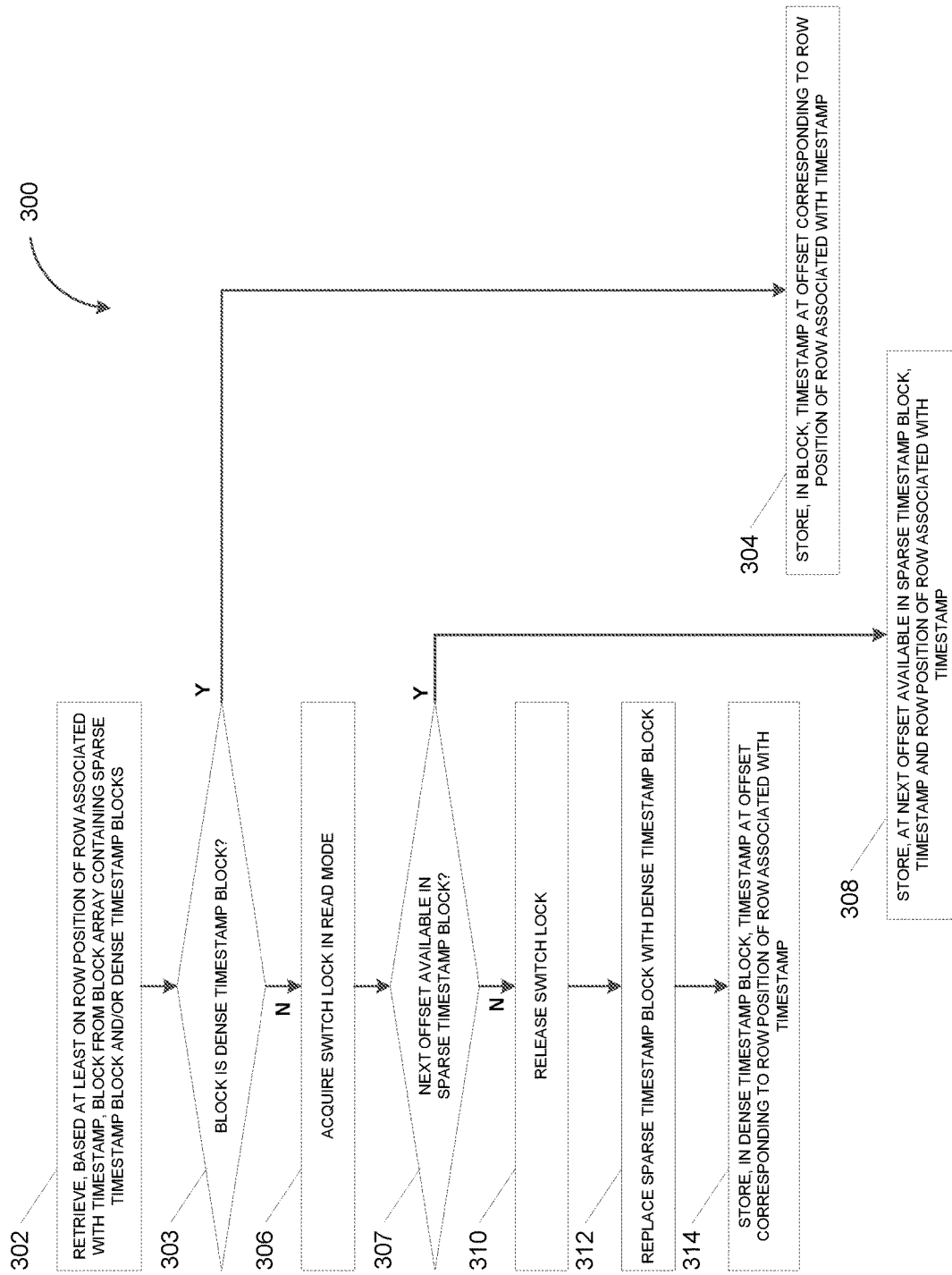
FIG. 3A depicts a flowchart illustrating a process for setting a timestamp in a dense timestamp block or a sparse timestamp block, in accordance with some example embodiment.

FIG. 3A depicts a flowchart illustrating a process 300 for setting a timestamp in a dense timestamp block or a sparse timestamp block, in accordance with some example embodiments. Referring to FIGS. 1, 2A-B, and 3A, the process 300 may be performed by the database management system 110, for example, by the timestamp access controller 140. For instance, the timestamp access controller 140 may perform the process 300 in order to store, in the sparse timestamp block 250, a timestamp associated with the first transaction 125a or the second transaction 125b. As noted, in the event the sparse timestamp block 250 has reached maximum capacity, the sparse timestamp block 250 may be replaced with the dense timestamp block 200 in order to accommodate the timestamp associated with the first transaction 125a or the second transaction 125b.

At 302, the timestamp access controller 140 may retrieve, based at least on a row position of a row associated with the timestamp, a timestamp block from a timestamp block vector containing sparse timestamp blocks and/or dense timestamp blocks. For example, the database 115 may maintain a timestamp block vector that includes dense timestamp blocks such as the dense timestamp block 200 as well as sparse timestamp blocks such as the sparse timestamp block 250. When a transaction operates on a row in the range 210 of rows, for example, the timestamp access controller 140 may identify, based on the timestamp block vector, the timestamp block that is associated with the range 210 of rows in order to access that timestamp block to write a timestamp associated with the transaction. Although the sparse timestamp block 250 may be allocated with less storage space than the dense timestamp block 200, FIG. 2A-B shows that the sparse timestamp block 250 may nevertheless represent the same range 210 of rows in the database 115 as the dense timestamp block 200. Accordingly, each range of rows in the database 115 may be associated with either a sparse timestamp block or a dense timestamp block for storing creation timestamps. Furthermore, each range of rows in the database 115 may also be associated with either a sparse timestamp block or a dense timestamp block for storing deletion timestamps.

At 303, the timestamp access controller 140 may determine, based at least on the header of the block, whether the block is a dense timestamp block. For example, as noted, the header 260 of the sparse timestamp block 250 may include a flag identifying the sparse timestamp block 250 as a sparse timestamp block. Accordingly, the timestamp access controller 140 may determine, based on the value of the flag included in the header of block, whether the block is a sparse timestamp block or a dense timestamp block.

At 303-Y, the timestamp access controller 140 may determine that the block is a dense timestamp block. For example, the timestamp access controller 140 may determine that the block is the dense timestamp block 200, which may be allocated with sufficient storage space for storing the timestamps of every n quantity of rows (e.g., rows $r_1$, $r_2$, $r_3$, $r_4$, . . . , $r_n$) in the range 210. As such, at 304, the timestamp access controller 140 may store, in the block, the timestamp at an offset corresponding to the row position of the row associated with the timestamp. For example, the timestamp access controller 140 may store, at the i-th offset in the dense timestamp block 200, the i-th timestamp $t_i$ associated with the i-th row $r_i$ in the range 210. The i-th offset in the dense timestamp block 200 may be determined based on a row position of the i-th row $r_i$ and the row position of the first row $r_1$ associated with the timestamp $t_1$ in the dense timestamp block 200.

At 303-N, the timestamp access controller 140 may determine that the block is not a dense timestamp block. For example, the timestamp access controller 140 may determine that the block is the sparse timestamp block 250 instead of the dense timestamp block 200. As such, at 306, the timestamp access controller 140 may acquire a switch lock in a read mode. The switch lock in the read mode may prevent other transactions from performing operations (e.g., insertion, deletion, update, and/or the like) on the range 210 of rows associated with the sparse timestamp block 250 that necessarily generate timestamps (e.g., creation timestamps, deletion timestamps, and/or the like). The generation of these timestamps may trigger a separate switch to the dense timestamp block 200, which may be avoided by the imposition of the switch lock in the read mode. Nevertheless, it should be appreciated the switch lock in the read mode may not prevent all access to the range 210 of rows in the database 115. Instead, while the timestamp access controller 140 has acquired in the switch lock in the read mode, other transactions may still read from the range 210 of rows in the database 115.

At 307, the timestamp access controller 140 may determine, based on a header of the sparse timestamp block, whether a next offset is available in the sparse timestamp block for storing the timestamp. For example, the timestamp access controller 140 may determine, based on the header 260 of the sparse timestamp block 250, whether the sparse timestamp block 250 has a next offset available for storing the timestamp.

At 307-Y, the timestamp access controller 140 may determine that a next offset is available in the sparse timestamp block for storing the timestamp. For instance, the timestamp access controller 140 may determine that a next offset is available in the sparse timestamp block 250 for storing the timestamp when the sparse timestamp block 250 has not reached maximum capacity. Accordingly, at 308, the timestamp access controller 140 may store, at the next offset available in the sparse timestamp block, the timestamp and the row position of the row associated with the timestamp. For example, the timestamp access controller 140 may store, at the next offset available in the sparse timestamp block 250, the i-th timestamp $t_i$ associated with the i-th row $r_i$ in the range 210 as well as the row position of the i-th row $r_i$ in the range 210.

Alternatively, at 307-N, the timestamp access controller 140 may determine that a next offset is not available in the sparse timestamp block for storing the timestamp. For instance, the timestamp access controller 140 may determine that a next offset is not available in the sparse timestamp block 250 for storing the timestamp if the sparse timestamp block 250 has reached maximum capacity. As such, at 310, the timestamp access controller 140 may release the switch lock. Furthermore, at 312, the timestamp access controller 140 may replace the sparse timestamp block with a dense timestamp block. For example, the timestamp access controller 140 may replace the sparse timestamp block 250 with the dense timestamp block 200 by at least migrating, to the dense timestamp block 200, the timestamps stored in the sparse timestamp block 250. At 314, the timestamp access controller 140 may store, in the dense timestamp block, the timestamp at an offset corresponding to the row position of the row associated with the timestamp. For instance, the timestamp access controller 140 may store, at the i-th offset in the dense timestamp block 200, the i-th timestamp $t_i$ associated with the i-th row $r_i$ in the range 210.

To further illustrate, Table 2 below depicts pseudo programming code for setting a timestamp.

TABLE 2

```
inline static bool setFunctor(MVCCSPTSAccesor *impl,
MVCCBlockHeader *bhdr, size_t offset,
TransactionManager::MVCCTimestamp ts)
{
    return impl->setTS(bhdr, offset, ts)
}
MVCCSPTSAccesor::setTS(MVCCBlockHeader *bhdr, size_t offset,
TransactionManager::MVCCTimestamp ts)
{
    if (bhdr.isSparseBlock( )){
        bool setDone
        = static_cast<MVCCSparseTimestampBlock>(bhdr)->set(offset,
        ts)
        if (!setDone) {
            setDone = switchBlockAndSet(bhr->m_StartPos, offset,
ts)
        }
        return setDone
    }
    else {
        return    static_cast<MVCCTimestampBlock    *>(bhdr)-
>set(offset, ts)
    }
}
```

Figure 3B:
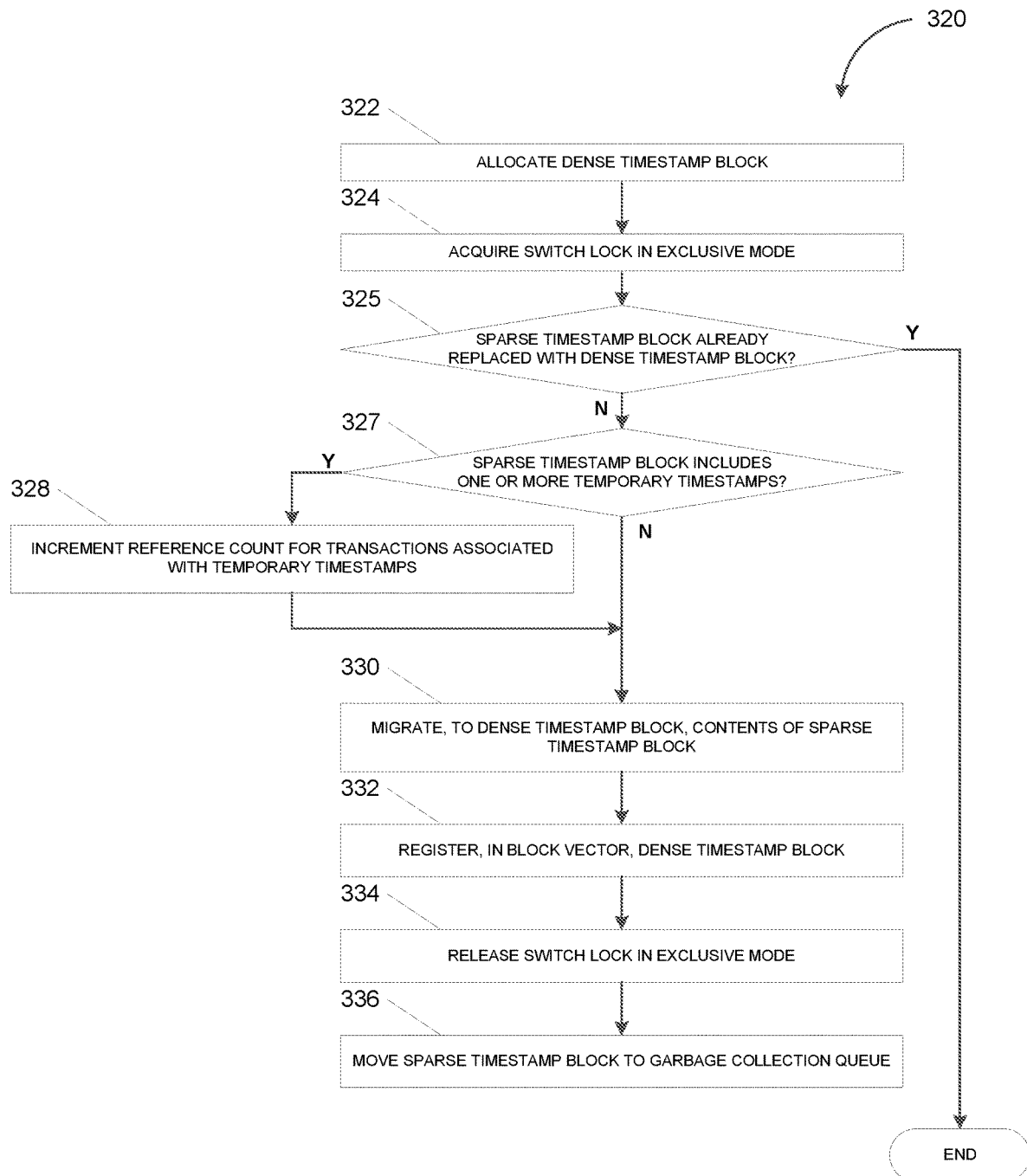
FIG. 3B depicts a flowchart illustrating a process for replacing a sparse timestamp block with a dense timestamp block, in accordance with some example embodiments.

FIG. 3B depicts a flowchart illustrating a process 320 for replacing a sparse timestamp block with a dense timestamp block, in accordance with some example embodiments. Referring to FIGS. 1, 2A-B, and 3A-B, the process 320 may be performed by the database management system 110, for example, by the timestamp access controller 140. Furthermore, the process 320 may be performed to implement operation 312 of the process 300. The process 320 may be performed by the timestamp access controller 140 in order to replace, for example, the sparse timestamp block 250 with the dense timestamp block 200. The replacement of the sparse timestamp block 250 may be triggered by the sparse timestamp block 250 reaching maximum capacity and unable to accommodate the timestamp associated with the first transaction 125a or the second transaction 125b.

At 322, the timestamp access controller 140 may allocate the dense timestamp block 200. For example, the timestamp access controller 140 may allocate the dense timestamp block 200, which may include sufficient storage space for storing the n quantity of timestamps (e.g., timestamps $t_1$, $t_2$, t, $t_4$, ..., $t_n$) associated with the n quantity of rows (e.g., rows $r_1$, $r_2$, $r_3$, $r_4$, ..., $r_n$) included in the range 210 of rows in the database 115. By contrast, the sparse timestamp block 250 that is being replaced may include sufficient storage space for storing the timestamps of only a portion of the n quantity of rows (e.g., rows $r_1$, $r_2$, $r_3$, $r_4$, ..., $r_n$) included in the range 210 of rows in the database 115.

At 324, the timestamp access controller 140 may acquire a switch lock in an exclusive mode. For example, the timestamp access controller 140 may acquire the switch lock in the exclusive mode in order to prevent other transactions from performing any operations (e.g., insertion, deletion, selection, update, and/or the like) that access the range 210 of rows in the database 115. In addition to preventing transactions that necessarily generate timestamps that may trigger a separate switch to the dense timestamp block 200, the switch lock in the exclusive mode may also prevent transactions that merely read from the range 210 of rows in the database 115.

At 325, the timestamp access controller 140 may determine whether the sparse timestamp block has already been replaced with a dense timestamp block. For example, the timestamp access controller 140 may determine whether the sparse timestamp block 250 has already been replaced with the dense timestamp block 200 by a concurrent writer thread.

At 325-Y, the timestamp access controller 140 may determine that the sparse timestamp block has already been replaced with a dense timestamp block. As such, the process 320 may terminate. For example, the timestamp access controller 140 may terminate the process 320 to replace the sparse timestamp block 250 if the sparse timestamp block 250 has already been replaced with the dense timestamp block 200 by a concurrent writer thread.

At 325-N, the timestamp access controller 140 may determine that the sparse timestamp block has not been replaced with a dense timestamp block. As such, at 327, the timestamp access controller 140 may determine whether the sparse timestamp block includes one or more temporary timestamps. In some example embodiments, the sparse timestamp block 250 may include one or more temporary timestamps for transactions that have yet to undergo a post commit process to replace the temporary timestamps with the actual commit timestamps of the transactions stored in the corresponding transaction control blocks (TCBs).

If, at 327-Y, the timestamp access controller 140 determines that the sparse timestamp block includes one or more temporary timestamps, the timestamp access controller 140 may, at 328, increment a reference count of the transaction control blocks of the transactions associated with the one or more temporary timestamps. As noted, any temporary timestamps in the sparse timestamp block 250 may eventually be replaced with the actual commit timestamps of the corresponding transactions. This replacement may be performed by a separate post commit thread using the commit timestamps stored in the transaction control blocks (TCBs) of the corresponding transactions. Nevertheless, the replacement of the temporary timestamps and the release of the corresponding transaction control blocks may be blocked by the acquisition of the switch lock in the exclusive mode during the replacement of the sparse timestamp block 250 with the dense timestamp block 200. Once the sparse timestamp block 250 is replaced with the dense timestamp block 200, the pending post commit thread may resume operation on the dense timestamp block 200 including by replacing the temporary timestamps that the timestamp access controller 140 has migrated to the dense timestamp block 200. Upon replacing a temporary timestamp with an actual commit timestamp, the post commit thread may release the corresponding transaction control block (TCB) storing the commit timestamp.

Unlike the timestamp access controller 140, which may block the post commit thread from releasing the transaction control blocks (TCBs) associated with the temporary timestamps stored in the sparse timestamp block 250, a reader thread still reading from the sparse timestamp block 250 may be unable to prevent the release of the transaction control blocks (TCBs) by the post commit thread. This may be the case even though the post commit thread continues to the dense timestamp block 200 once the sparse timestamp block 250 is replaced with the dense timestamp block 200. The release of the transaction control blocks, which may store the actual commit timestamps associated with the temporary timestamps held in the sparse timestamp block 250, may prevent the reader thread from resolving the temporary timestamps encountered in the sparse timestamp block 250. As such, to prevent the premature release of the transaction control blocks (TCBs) but without imposing a lock for reads on the sparse timestamp block 250, the timestamp access controller 140 may increment the reference count associated with the transaction control blocks associated with the temporary timestamps in the sparse timestamp block 250. The reference count may be used during garbage collection to determine the presence of active reader threads operating on the sparse timestamp block 250. The release of the sparse timestamp block 250 as well as any corresponding transaction control blocks (TCBs) may be contingent upon the value of the reference count.

Alternatively, the process 320 may resume at operation 330 if the timestamp access controller 140 determines, at 327-N, that the sparse timestamp block does not include any temporary timestamps. For example, it may be unnecessary for the timestamp access controller 140 to increment the reference count of a transaction control block (TCB) if the sparse timestamp block 250 does not include any temporary timestamps. Accordingly, the process 320 may resume at operation 330 during which the timestamp access controller 140 may migrate the contents of the sparse timestamp block 250 to the dense timestamp block 200.

At 330, the timestamp access controller 140 may migrate, to the dense timestamp block, the contents of the sparse timestamp block. In some example embodiments, as shown in FIG. 2A, the timestamps in the dense timestamp block 200 may be indexed in accordance with the position of the corresponding rows in the range 210 of the rows in the database 115. By contrast, the timestamps in the sparse timestamp block 250 may be stored with the corresponding row positions. Furthermore, the timestamps in the sparse timestamp block 250 may not be sorted in accordance with the corresponding row positions, for example, when the sparse timestamp block 250 is being used to store deletion timestamps. Accordingly, to migrate the contents of the sparse timestamp block 250 to the dense timestamp block 200, the timestamp access controller 140 may be configured to store each timestamp in the sparse timestamp block 250 at an offset in the dense timestamp block 200 determined based on the corresponding row positions.

For instance, in the example show in FIG. 2B, the timestamp $t_2$ associated with the second row $r_2$ may be migrated to the dense timestamp block 200 by at least storing, at an offset in the dense timestamp block 200 corresponding to the second row $r_2$, the timestamp $t_2$ associated with the second row $r_2$. Alternatively and/or additionally, the timestamp $t_{10}$ associated with the tenth row $r_{10}$ may also be migrated to the dense timestamp block 200 by at least storing, at an offset in the dense timestamp block 200 corresponding to the tenth row $r_{10}$, the timestamp $t_{10}$. The timestamp $t_8$ associated with the eighth row $r_8$ may be migrated to the dense timestamp block 200 by at least storing the timestamp $t_8$ at an offset in the dense timestamp block 200 corresponding to the eighth row $r_8$. Furthermore, the timestamp $t_3$ associated with the third row $r_3$ in the range 210 may be migrated to the dense timestamp block 200 by at least storing the timestamp $t_3$ at an offset in the dense timestamp block 200 corresponding to the third row $r_3$.

At 332, the timestamp access controller 140 may register, in the block vector, the dense timestamp block. Furthermore, at 334, the timestamp access controller 140 may release the switch lock in the exclusive mode. For example, the timestamp access controller 140 may register the dense timestamp block 200 in the block vector such that the dense timestamp block 200 may be identified as being associated with the range 210 of rows in the database 115. The timestamp access controller 140 may further release the switch lock in the exclusive mode acquired at operation 324. In doing so, the timestamp access controller 140 may enable the operation of other threads including, for example, post commit threads, undo threads, garbage collection threads, and/or the like.

At 336, the timestamp access controller 140 may move the sparse timestamp block to a transient queue and/or a garbage collection queue. For example, the timestamp access controller 140 may move the sparse timestamp block 250 to a garbage collection queue. However, the sparse timestamp block 250 may not be released until all active reader threads have completed operation on the database table containing the range 210 of rows. As such, in some example embodiments, the sparse timestamp block 250 may remain in a transient queue until all active reader threads operating on the sparse timestamp block 250 are complete. The sparse timestamp block 250 without any active reader threads may then be moved into the garbage collection queue for reclamation.

In some example embodiments, garbage collection may be performed by a garbage collection thread configured to update the row state of each row in the database table including, for example, the range 210 of rows. For instance, when there are no active reader threads operating on the database table, the garbage collection thread may update the row state of all inserted rows as visible and all deleted rows as invisible to transactions operating on the database table subsequent to the garbage collection process.

Figure 3C:
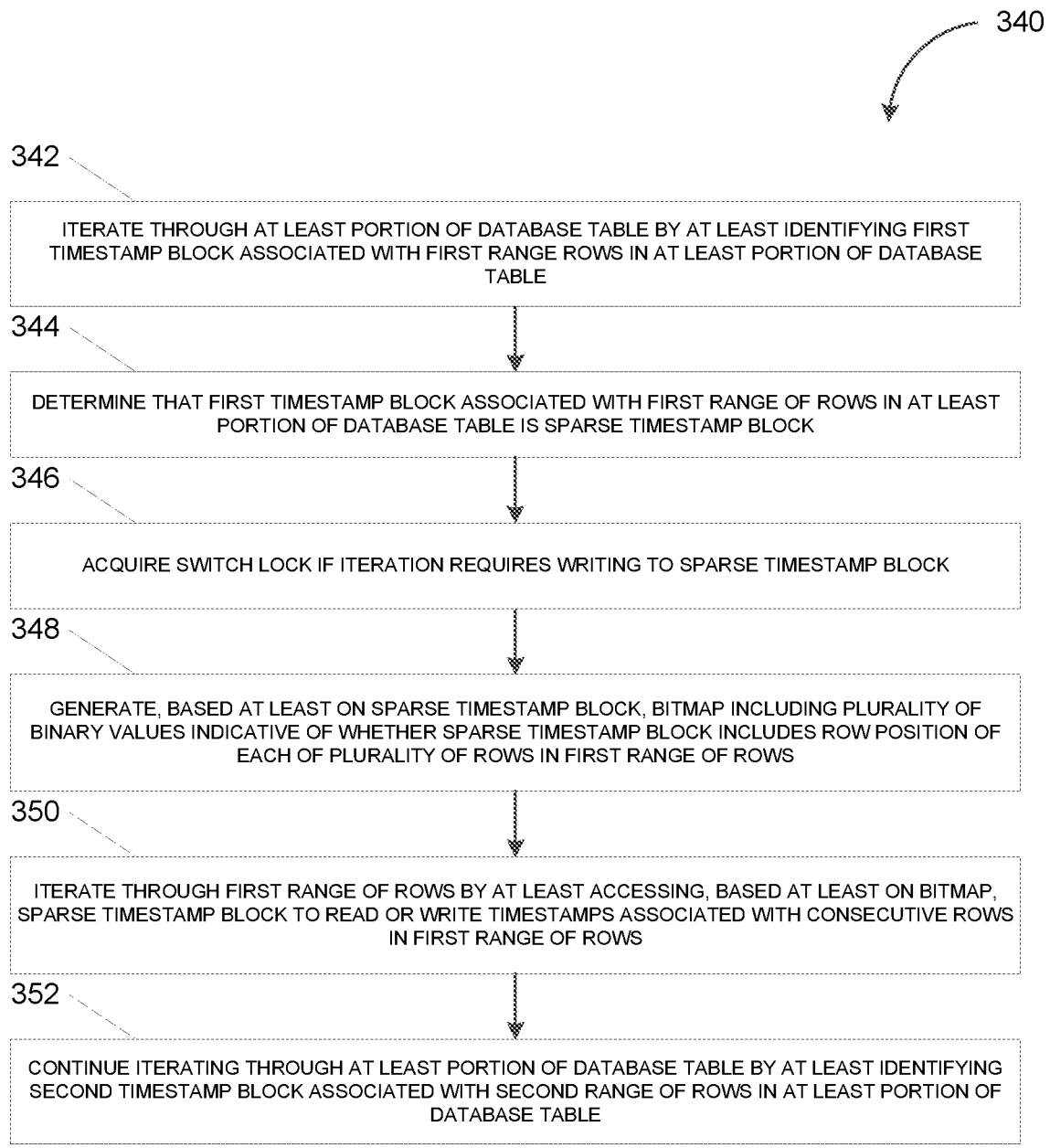
FIG. 3C depicts a flowchart illustrating a process for iterating through a range of rows in a database table, in accordance with some example embodiments.

FIG. 3C depicts a flowchart illustrating a process 340 for iterating through a range of rows in a database table, in accordance with some example embodiments. Referring to FIGS. 1, 2A-B, and 3C, the process 340 may be performed by the database management system 110, for example, by the timestamp access controller 140 in order to iterate through at least a portion of a table in the database 115 that includes the range 210 of rows. The iteration may include reading and/or writing timestamps associated with consecutive rows including the rows occupying the range 210. Moreover, it should be appreciated that the range 210 may be associated with the sparse timestamp block 250 or the dense timestamp block 200. As noted, the timestamp access controller 140 may iterate through the range 210 in order to generate a list of all visible rows and/or invisible rows in the range 210 and/or at least a portion of a database table including the range 210. Alternatively and/or additionally, the iteration of the range 210 may be performed in order to generate a list of all rows that have been inserted or deleted within a specified timeframe (e.g., between a first time $t_1$ and a second time $t_2$).

At 342, the timestamp access controller 140 may iterate through at least a portion of a database table stored in the database 115 by at least identifying a first timestamp block associated with a first range of rows in at least the portion of the database table. For example, the timestamp access controller 140 may iterate through at least a portion of a database table stored in the database 115 in order to perform a bulk transaction inserting or deleting a large quantity of consecutive rows in the database table. Accordingly, the timestamp access controller 140 may be required to iterate through multiple ranges of rows in the database table, each of which be associated with a timestamp block. As noted, the timestamp block associated with a range of rows may be either a sparse timestamp block or a dense timestamp block. The timestamp access controller 140 may therefore iterate through a range of rows in the database table including by accessing the corresponding timestamp block to read timestamps from that timestamp block or write timestamps into the timestamp block.

At 344, the timestamp access controller 140 may determine that the first timestamp block associated with the first range of rows in at least the portion of database table is a sparse timestamp block. For example, as shown in FIGS. 2A-B, the range 210 of rows in the database 115 may be associated with the sparse timestamp block 250 or the dense timestamp block 200. In some example embodiments, the timestamp access controller 140 may first allocate the sparse timestamp block 250 for storing timestamps associated with the range 210 before replacing the sparse timestamp block 250 with the dense timestamp block 200, for example, when the sparse timestamp block 250 reaches maximum capacity and is unable to accommodate any additional timestamps associated with the range 210 of rows. Accordingly, before the sparse timestamp block 250 reaches maximum capacity, the range 210 may be associated with the sparse timestamp block 250. That the sparse timestamp block 250 is a sparse timestamp block and not a dense timestamp block may be identified by accessing the flag in the header 260 of the sparse timestamp block 250.

At 346, the timestamp access controller 140 may acquire a switch lock if the iteration requires writing to the sparse time stamp block. For example, if timestamp access controller 140 is iterating through the range 210 in order to write timestamps associated with consecutive rows in the range 210, the timestamp access controller 140 may acquire a switch lock because the writing of timestamps to the sparse timestamp block 250 may eventually necessitate the replacement of the sparse timestamp block 250 with the dense timestamp block 200. As noted, by acquiring the switch lock, the timestamp access controller 140 may prevent other transactions from accessing the range 210 to perform operations that would generate additional timestamps while the sparse timestamp block 250 may be switched to the dense timestamp block 200. Although the iteration may require multiple writes to the sparse timestamp block 250, it should be appreciated that the timestamp access controller 140 may be configured to acquire the switch lock once and hold the switch lock until the iteration is complete instead of acquiring and releasing the switch lock multiple times for each write to the sparse timestamp block 250. Moreover, once the sparse timestamp block 250 has been switched to the dense timestamp block 200, subsequent reads may be performed on the dense timestamp block 200 instead of the sparse timestamp block 250.

At 348, the timestamp access controller 140 may generate, based at least on the sparse timestamp block, a bitmap including a plurality of binary values indicative of whether the sparse timestamp block includes a row position of each of a plurality of rows in the first range of rows in at least the portion of the database table. As shown in FIG. 2B, the timestamp access controller 140 may generate the bitmap 270 in order to optimize the iteration through the range 210 of rows in the database 115. The bitmap 270 may include an n quantity of binary values (e.g., 0, 1, 1, 0, 0, 0, 0, 1, 0, 1, 0, 0, . . . , $b_n$), each of which corresponding to one of the n quantity of rows (e.g., rows $r_1, r_2, r_3, r_4, \ldots, r_n$) in the range 210. For instance, the i-th binary value in the bitmap 270 may correspond to the i-th row $r_i$ in the range 210. The timestamp access controller 140 may determine, based at least on the value of the i-th binary value in the bitmap 270, whether the sparse timestamp block 250 includes a timestamp associated with the i-th row $r_i$ in the range 210. For instance, if the value of the i-th binary value in the bitmap 270 indicates that the sparse timestamp block 250 includes the timestamp associated with the i-th row $r_i$ in the range 210, the timestamp access controller 140 may access the sparse timestamp block 250 to locate the row position of the i-th row $r_i$ in the range 210. Alternatively, the timestamp access controller 140 may avoid searching the sparse timestamp block 250 if the value of the i-th binary value in the bitmap 270 indicates that the timestamp associated with the i-th row $r_i$ in the range 210 is absent from the sparse timestamp block 250.

In some example embodiments, the timestamp access controller 140 may be required to determine whether a particular row position is present in the sparse timestamp block 250 in order to read and to write a timestamp associated with the row position in the sparse timestamp block 250. For instance, prior to writing a deletion timestamp to the sparse timestamp block 250, the timestamp access controller 140 may use the bitmap 270 to determine if the same row position is already present in the sparse timestamp block 250 and associated with a valid timestamp. When that is the case, the timestamp access controller 140 may determine that the row corresponding to the row position has already been deleted, for example, by a previous transaction. The timestamp access controller 140 may therefore avoid writing another deletion timestamp to the sparse timestamp block 250, which would provide an erroneous indication of the same row being deleted multiple times.

At 350, the timestamp access controller 140 may iterate through the first range of rows by at least accessing, based at least on the bitmap, the sparse timestamp block to read or write timestamps associated with consecutive rows in the first range of rows. For example, the timestamp access controller 140 may use the bitmap 270 to iterate through the range 210 of rows associated with the sparse timestamp block 250. The timestamp access controller 140 may use the bitmap 270 in order to read timestamps from the sparse timestamp block 250 or to write timestamps to the sparse timestamp block 250. For instance, to read a timestamp associated with a row in the range 210 of rows, the timestamp access controller 140 may determine, based at least on the bitmap 270, whether the row position corresponding to the row is present in the sparse timestamp block 250 and avoid searching the sparse timestamp block 250 for that row position if the corresponding binary value in the bitmap 270 indicates the row position as being absent from the sparse timestamp block 250. Alternatively, to write a timestamp associated with a row in the range 210 of rows, the timestamp access controller 140 may determine, based at least on the bitmap 270, whether the row position corresponding to the row is present in the sparse timestamp block 250.

The timestamp access controller 140 may avoid searching the sparse timestamp block 260 for the row position if the corresponding binary value in the bitmap 270 indicates the row position is absent from the sparse timestamp block 250. By contrast, if the binary value in the bitmap indicates that the row position if present in the sparse timestamp block 250, the timestamp access controller 140 may search the sparse timestamp block 260 to locate the row position and the corresponding timestamp. The timestamp access controller 140 may write the timestamp to the sparse timestamp block 260 with the corresponding row position only if the row position included in the sparse timestamp block 260 is associated with an invalid timestamp. Otherwise, the timestamp access controller 140 may avoid writing another deletion timestamp to the sparse timestamp block 250, which would provide an erroneous indication of the same row being deleted multiple times.

At 352, the timestamp access controller 140 may continue iterating through at least the portion of the database table by at least identifying a second timestamp block associated with a second range of rows in at least the portion of the database table. For example, the timestamp access controller 140 may continue iterating through the database table by continuing onto a next range of rows in the database table. Moreover, the timestamp access controller 140 may access the corresponding timestamp block to read timestamps from that timestamp block or write timestamps to that timestamp block.

FIG. 3D depicts a flowchart illustrating a process 360 for writing a deletion timestamp to a sparse timestamp block or a dense timestamp block, in accordance with some example embodiments. Referring to FIGS. 1, 2A-B, and 3D, the process 360 may be performed by the database management system 110, for example, by the timestamp access controller 140. For instance, the timestamp access controller 140 may perform the process 360 in order to write, to the dense timestamp block 200 or the sparse timestamp block 250, a deletion timestamp corresponding to a commit timestamp of a transaction that deleted a row from the range 210 of rows in the database 115.

At 362, the timestamp access controller 140 may determine that a transaction is performed at a database to delete a row from a range of rows in a database table. For example, the timestamp access controller 140 may determine that the first transaction 125a is performed at the database 115 to delete a row from the range 210 of rows in the database 115.

At 363, the timestamp access controller 140 may determine whether a timestamp block associated with range of rows includes a valid timestamp for a row position of the row deleted by the transaction. For instance, the timestamp access controller 140 may search the dense timestamp block 200 or the sparse timestamp block 250 associated with the range 210 to determine whether a valid timestamp associated with the row position of the row deleted by the first transaction 125a is present in the dense timestamp block 200 or the sparse timestamp block 250.

At 363-Y, the timestamp access controller 140 may determine that the timestamp block includes a valid timestamp for the row position of the row deleted by the transaction. When that is the case, the process 360 may terminate as the row has already been deleted by another transaction. For example, the timestamp access controller 140 may determine that the dense timestamp block 200 or the sparse timestamp block 250 may already include a valid timestamp for the row in the range 210 deleted by the first transaction 125a. This may be the case because the same row has already been deleted by another transaction such as, for example, the second transaction 125b. Accordingly, the timestamp access controller 140 may avoid writing the timestamp of the first transaction 125a in the dense timestamp block 200 or the sparse timestamp block 250 because doing so may provide an erroneous indication of the same row in the range 210 being deleted multiple times (e.g., by the first transaction 125a and the second transaction 125b).

Alternatively, at 363-N, the timestamp access controller 140 may determine that the timestamp block does not include a valid timestamp for the row position of the row deleted by the transaction. As such, at 364, the timestamp access controller 140 may write, to the timestamp block, at least the timestamp of the transaction deleting the row from the range of rows in the database table. For instance, the timestamp access controller 140 may determine that the dense timestamp block 200 or the sparse timestamp block 250 does not already include a valid timestamp for the row in the range 210 deleted by the first transaction 125a. As such, the timestamp access controller 140 may write the timestamp of the first transaction 125 to the dense timestamp block 200 at an offset corresponding to the row position of the row deleted by the first transaction 125. Alternatively, the timestamp access controller 140 may write, to the sparse timestamp block 250, the timestamp of the first transaction 125 as well as the row position of the row deleted by the first transaction 125. As noted, in some example embodiments, writing to the sparse timestamp block 250 may trigger the replacement of the sparse timestamp block 250 if the sparse timestamp block 250 has reached maximum capacity. The sparse timestamp block 250 may be replaced with the dense timestamp block 200 such that the timestamp of the first transaction 125 is written to the dense timestamp block 200 instead of the sparse timestamp block 250.

Figure 4:
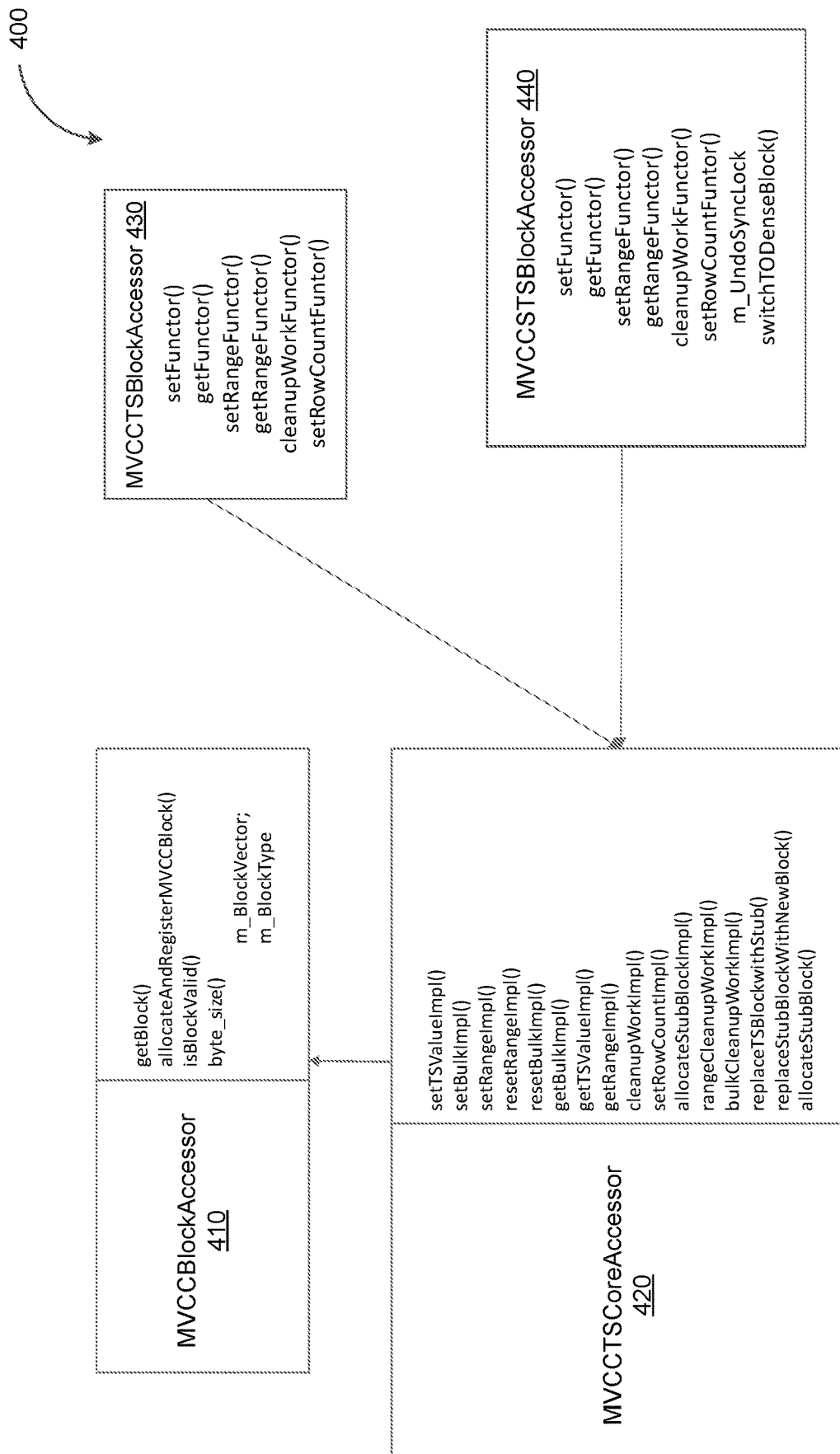
FIG. 4 depicts a class diagram illustrating a timestamp accessor class, in accordance with some example embodiments.

FIG. 4 depicts a class diagram illustrating a timestamp accessor class 400, in accordance with some example embodiments. Referring to FIGS. 1 and 4, the timestamp access controller 140 may be implemented based on the timestamp accessor class 400. As shown in FIG. 4, the timestamp accessor class 400 may include an MVCCBlockAccessor 410, an MVCCTSCoreAccessor 420, an MVCCTSBlockAccessor 430, and an MVCCSPTSBlockAccessor 440.

Referring again to FIG. 4, the MVCCBlockAccessor 410 may include methods or implementations required for allocating, indexing, and managing timestamp blocks including, for example, the dense timestamp block 200, the sparse timestamp block 250, and/or the like. The MVCCTSCoreAccessor 420 may include the implementation of all the timestamp-based functionality which takes a functor as an argument. However, it should be appreciated that the implementations included in the MVCCTSCoreAccessor 420 may include logic for acquiring a timestamp block but not logic for reading or writing to a timestamp block. Furthermore, FIG. 4 shows the MVCCTSBlockAccessor 430 as including a series of functors based on MVCCTimestampBlock. The MVCCTSBlockAccessor 430 may invoke the methods of the MVCCTSCoreAccessor 420 via these functors. Moreover, the MVCCTSBlockAccessor 430 may be used for accessing creation timestamps (CTS) stored, in some example embodiments, in dense timestamp blocks instead of sparse timestamp blocks.

The MVCCSTSBlockAccessor 440 may include its own implementation of functors along with the additional members required for an adaptive timestamp controller such as, for example, the timestamp access controller 140, capable of accessing sparse timestamp blocks as well as dense timestamp blocks. Alternatively, the MVCSTSBlockAccessor 440 may be implemented as its own independent class using, for example, the pseudo programming code shown in Table 3 below.

TABLE 3

```
const volatile TransactionManager::MVCCTimestamp& get(const RowPos rpos)
{
  BlockHandle& bh = getBlock(getBlockInex(rpos));
  if (bh.isInvalid( )) return invalidTS;
  auto& header = bh.getBlockForRead<MVCCBlockHeader>( );
  if (header.isSparseBlock( ))
  {
    return
    bh.getBlockForRead<MVCCSparseTimestampBlock>( ).get-
    (getOffset(rpos));
  }
  return
  bh.getBlockForRead<MVCCTimestampBlock>.get(getOffset(rpos));
}
```

Figure 5:
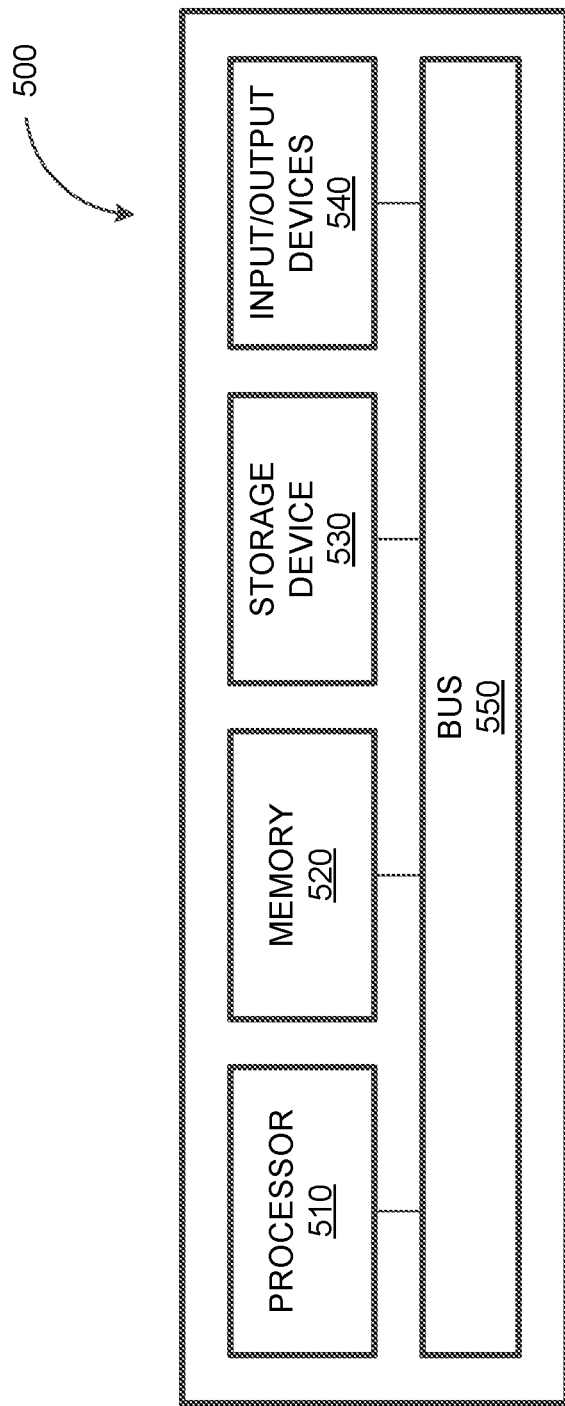
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 100 and/or any components therein including, for example, the timestamp access controller 140.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database management system 110 including, for example, the timestamp access controller 140. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   iterating through at least a portion of a table stored in a database by at least identifying a first timestamp block associated with a first range of rows comprising at least the portion of the table;
   in response to determining that the first timestamp block comprises a sparse timestamp block, storing timestamps associated with some but not all of a plurality of rows in the first range of rows, generating a bitmap including a plurality of binary values, each of the plurality of binary values corresponding to one of the plurality of rows in the first range of rows, and each of the plurality of binary values indicating whether the first timestamp block includes a timestamp associated with a corresponding one of the plurality of rows in the first range of rows;
   iterating through the first range of rows by at least accessing, based at least on the bitmap, the first timestamp block to read or write at least a first timestamp associated with a first row in the first range of rows, the first timestamp further being associated with a first transaction; and
   in response the first timestamp block having reached a maximum capacity during a writing of at least the first timestamp, allocating a second timestamp block for storing the first timestamp, the second timestamp block being a first dense timestamp block configured to store every timestamp associated with the first range of rows.

2. The system of claim 1, wherein the sparse timestamp block further stores a second timestamp associated with a second row in the first range of rows, wherein the second timestamp is associated with the first transaction or a second transaction, and wherein the first timestamp and the second timestamp are stored without being sorted based on a respective row position of the first row and the second row.

3. The system of claim 1, further comprising:
   in response to determining that the first timestamp block comprises a second dense timestamp block, accessing the first timestamp block to read or write the first timestamp, the second dense timestamp block being configured to store every timestamp associated with the first range of rows, and the first timestamp being read or written at an offset in the first timestamp block corresponding to a row position of the first row.

4. The system of claim 1, wherein reading the first timestamp comprises determining, based at least on the bitmap, whether the first timestamp block includes a timestamp for a row position of the first row.

5. The system of claim 1, wherein the first timestamp is written to the first timestamp block based at least on the bitmap indicating an absence of a second timestamp associated with first row in the first timestamp block.

6. The system of claim 1, further comprising:
   acquiring, prior to writing the first timestamp to the first timestamp block, a lock configured to prevent the first timestamp block from being replaced with a third timestamp block by another thread writing to the first timestamp block.

7. The system of claim 1, wherein the first transaction inserts or deletes the plurality consecutive rows comprising at least the portion of the table in the database, and wherein the one or more timestamps comprise creation timestamps associated with the insertion of each of the plurality of consecutive rows or deletion timestamps associated with the deletion of each of the plurality of consecutive rows.

8. The system of claim 1, wherein at least the portion of the table is being iterated in response to the first transaction inserting or deleting a plurality of consecutive rows comprising at least the portion of the table.

9. The system of claim 8, further comprising:
determining a quantity of rows in a second range of rows comprising the table affected by the first transaction;
in response to the quantity of rows exceeding a capacity of the sparse timestamp block, allocating a second dense timestamp block instead of the sparse timestamp block, the second dense timestamp block configured to store every timestamp associated with the second range of rows; and
iterating through the second range of rows to at least write the first timestamp associated with the first transaction.

10. The system of claim 1, further comprising:
performing a second transaction on the first row in the first range of rows, the second transaction being performed on a version of the first row modified by the first transaction based at least on the first timestamp associated with the first transaction being less than a second timestamp associated with the second transaction.

11. The system of claim 1, wherein the iterating through at least the portion of the table further comprises identifying a second timestamp block associated with a second range of rows comprising at least the portion of the table.

12. The system of claim 1, further comprising:
iterating through at least the portion of the table to at least identify, based at least on one or more timestamps stored in the first timestamp block, all rows included in at least the portion of the table.

13. The system of claim 1, further comprising:
iterating through at least the portion of the table to at least identify, based at least on one or more timestamps stored in the first timestamp block, all rows in at least the portion of the table inserted or deleted between a first time and a second time.

14. A computer-implemented method, comprising:
iterating through at least a portion of a table stored in a database by at least identifying a first timestamp block associated with a first range of rows comprising at least the portion of the table;
in response to determining that the first timestamp block comprises a sparse timestamp block, storing timestamps associated with some but not all of a plurality of rows in the first range of rows, generating a bitmap including a plurality of binary values, each of the plurality of binary values corresponding to one of the plurality of rows in the first range of rows, and each of the plurality of binary values indicating whether the first timestamp block includes a timestamp associated with a corresponding one of the plurality of rows in the first range of rows;
iterating through the first range of rows by at least accessing, based at least on the bitmap, the first timestamp block to read or write at least a first timestamp associated with a first row in the first range of rows, the first timestamp further being associated with a first transaction; and in response the first timestamp block having reached a maximum capacity during a writing of at least the first timestamp, allocating a second timestamp block for storing the first timestamp, the second timestamp block being a first dense timestamp block configured to store every timestamp associated with the first range of rows.

15. The method of claim 14, wherein the sparse timestamp block further stores a second timestamp associated with a second row in the first range of rows, wherein the second timestamp is associated with the first transaction or a second transaction, and wherein the first timestamp and the second timestamp are stored without being sorted based on a respective row position of the first row and the second row.

16. The method of claim 14, further comprising:
in response to determining that the first timestamp block comprises a second dense timestamp block, accessing the first timestamp block to read or write the first timestamp, the second dense timestamp block being configured to store every timestamp associated with the first range of rows, and the first timestamp being read or written at an offset in the first timestamp block corresponding to a row position of the first row.

17. The method of claim 14, wherein reading the first timestamp comprises determining, based at least on the bitmap, whether the first timestamp block includes a timestamp for a row position of the first row.

18. The method of claim 14, wherein the first timestamp is written to the first timestamp block based at least on the bitmap indicating an absence of a second timestamp associated with first row in the first timestamp block.

19. A non-transitory computer readable medium storing instructions, which when executed by at least one data processor, result in operations comprising:
iterating through at least a portion of a table stored in a database by at least identifying a first timestamp block associated with a first range of rows comprising at least the portion of the table;
in response to determining that the first timestamp block comprises a sparse timestamp block storing timestamps associated with some but not all of a plurality of rows in the first range of rows, generating a bitmap including a plurality of binary values, each of the plurality of binary values corresponding to one of the plurality of rows in the first range of rows, and each of the plurality of binary values indicating whether the first timestamp block includes a timestamp associated with a corresponding one of the plurality of rows in the first range of rows;
iterating through the first range of rows by at least accessing, based at least on the bitmap, the first timestamp block to read or write at least a first timestamp associated with a first row in the first range of rows, the first timestamp further being associated with a first transaction; and
in response the first timestamp block having reached a maximum capacity during a writing of at least the first timestamp, allocating a second timestamp block for storing the first timestamp, the second timestamp block being a first dense timestamp block configured to store every timestamp associated with the first range of rows.

\* \* \* \* \*